(12) United States Patent
Riemenschneider et al.

(10) Patent No.: US 12,277,662 B2
(45) Date of Patent: Apr. 15, 2025

(54) OBJECT ALIGNMENT TECHNIQUES FOR ANIMATION

(71) Applicants: Pixar, Emeryville, CA (US); Disney Enterprises, Inc., Burbank, CA (US)

(72) Inventors: Hayko Riemenschneider, Zürich (CH); Clara Fernandez, Zürich (CH); Joan Massich, Zürich (CH); Christopher Richard Schroers, Uster (CH); Daniel Teece, Pasadena, CA (US); Rasmus Tamstorf, Los Angeles, CA (US); Charles Tappan, Los Angeles, CA (US); Mark Meyer, San Francisco, CA (US); Antoine Milliez, Bern (CH)

(73) Assignees: PIXAR, Emeryville, CA (US); DISNEY ENTERPRISES, INC., Burbank, CA (US)

( * ) Notice: Subject to any disclaimer, the term of this patent is extended or adjusted under 35 U.S.C. 154(b) by 169 days.

(21) Appl. No.: 17/977,935

(22) Filed: Oct. 31, 2022

(65) Prior Publication Data

US 2024/0144622 A1    May 2, 2024

(51) Int. Cl.
*G06T 19/20* (2011.01)
*G06T 7/50* (2017.01)
(Continued)

(52) U.S. Cl.
CPC .............. *G06T 19/20* (2013.01); *G06T 7/50* (2017.01); *G06T 13/20* (2013.01); *G06V 10/764* (2022.01);
(Continued)

(58) Field of Classification Search
CPC ........... G06T 19/20; G06T 7/50; G06T 13/20; G06T 2207/20076; G06T 2207/20081;
(Continued)

(56) References Cited

U.S. PATENT DOCUMENTS

| 8,643,654 B1 | 2/2014 | Green |
| 9,947,123 B1 | 4/2018 | Green |

(Continued)

OTHER PUBLICATIONS

Sharp, Nicholas, et al. "Diffusionnet: Discretization agnostic learning on surfaces." ACM Transactions on Graphics (TOG) 41.3 (2022): 1-16. (Year: 2022).*

(Continued)

*Primary Examiner* — Yu Chen
(74) *Attorney, Agent, or Firm* — Kilpatrick Townsend & Stockton LLP

(57) ABSTRACT

Techniques for aligning object representations for animation include analyzing a source object representation and a target object representation to identify a category of the source object and a category of the target object. Based on the category or categories of the objects, a feature extraction machine learning models is selected. The source object representation and the target object representation are provided as input to the selected feature extraction machine learning model to generate respective semantic descriptors and shape vectors for the source and target objects. Based on the semantic descriptors and the shape vectors for the source and target objects, an alignment machine learning model generates an aligned target object representation that is aligned with the source object representation and usable for animating the target object.

18 Claims, 7 Drawing Sheets

(51) Int. Cl.
*G06T 13/20* (2011.01)
*G06V 10/764* (2022.01)
*G06V 10/77* (2022.01)
*G06V 10/82* (2022.01)

(52) U.S. Cl.
CPC .......... *G06V 10/7715* (2022.01); *G06V 10/82* (2022.01); *G06T 2207/20076* (2013.01); *G06T 2207/20081* (2013.01); *G06T 2207/20084* (2013.01); *G06T 2207/30196* (2013.01); *G06T 2210/56* (2013.01); *G06T 2219/2004* (2013.01)

(58) Field of Classification Search
CPC . G06T 2207/20084; G06T 2207/30196; G06T 2210/56; G06V 10/7715; G06V 10/82; G06V 10/764
See application file for complete search history.

(56) References Cited

U.S. PATENT DOCUMENTS

| | | | | |
|---|---|---|---|---|
| 12,033,078 | B2* | 7/2024 | Li | G06V 20/20 |
| 2019/0026917 | A1* | 1/2019 | Liao | G06V 10/82 |
| 2019/0171868 | A1* | 6/2019 | Taigman | G06T 3/02 |
| 2022/0044072 | A1* | 2/2022 | Simonson | G06V 10/82 |
| 2022/0207843 | A1* | 6/2022 | Supancic, III | G06T 15/04 |
| 2023/0274492 | A1* | 8/2023 | Chen | G06T 17/00 |
| | | | | 345/419 |

OTHER PUBLICATIONS

"15.4. KD Trees", Open DSA, Available Online at: https://opendsa-server.cs.vt.edu/OpenDSA/Books/CS3/html/KDtree.html#, 2021, 6 pages.

Christopher, "K-Nearest Neighbor", Medium, Available Online at: https://medium.com/swlh/k-nearest-neighbor-ca2593d7a3c4, Feb. 2, 2021, 16 pages.

Selvi et al., "Diffusion Convolution Recurrent Neural Network—A Comprehensive Survey", IOP Conference Series: Materials Science and Engineering, vol. 1055, No. 1, Article 012119, Feb. 2021, 11 pages.

Sharp et al., "Diffusion is All You Need for Learning on Surfaces", arXiv:2012.00888v1 [cs.CV], Dec. 1, 2020, 16 pages.

* cited by examiner

500

```
┌─────────────────────────────────────────────────────────────┐
│ Obtain a source object representation representing a source │
│ object and a target object representation representing a    │
│ target object                                               │
│                          502                                │
└─────────────────────────────────────────────────────────────┘
                              │
                              ▼
┌─────────────────────────────────────────────────────────────┐
│ Identify a category of the source object and a category of  │
│ the target object                                           │
│                          504                                │
└─────────────────────────────────────────────────────────────┘
                              │
                              ▼
┌─────────────────────────────────────────────────────────────┐
│ Based on the category of the source object and the category │
│ of the target object, select a feature extraction machine   │
│ learning model from a set of feature extraction machine     │
│ learning models for different object categories             │
│                          506                                │
└─────────────────────────────────────────────────────────────┘
                              │
                              ▼
┌─────────────────────────────────────────────────────────────┐
│ Provide the source object representation and the target     │
│ object representation as input to the selected feature      │
│ extraction machine learning model                           │
│                          508                                │
└─────────────────────────────────────────────────────────────┘
                              │
                              ▼
┌─────────────────────────────────────────────────────────────┐
│ Generate, by the feature extraction machine learning model, │
│ information identifying parts of the source object,         │
│ information identifying parts of the target object, a shape │
│ vector for the source object, and a shape vector for the    │
│ target object                                               │
│                          510                                │
└─────────────────────────────────────────────────────────────┘
                              │
                              ▼
┌─────────────────────────────────────────────────────────────┐
│ Generate an aligned target object representation that is    │
│ aligned with the source object representation and useable   │
│ for animating the target object, the generating using an    │
│ alignment machine learning model based on the information   │
│ identifying parts of the source object, the information     │
│ identifying parts of the target object, the shape vector    │
│ for the source object, and the shape vector for the target  │
│ object                                                      │
│                          512                                │
└─────────────────────────────────────────────────────────────┘
```

FIG. 5

OBJECT ALIGNMENT TECHNIQUES FOR ANIMATION

BACKGROUND

This disclosure relates to computer animation and computer-generated imagery. More specifically, this disclosure is related to techniques for automatically transferring information from one computer model to another.

With the wide-spread availability of computers, animators and computer graphics artists can rely upon computers to assist in the animation and computer-generated imagery (CGI) process. This may include using computers to have physical models be represented by virtual models in computer memory. This may also include using computers to facilitate animation, for example, by the designing, posing, deforming, coloring, painting, or the like, of characters or other elements of a computer animation display.

The production of animated features and CGI may involve the extensive use of computer graphics techniques to produce a visually appealing image from the geometric description of an object or model that can be used to convey an element of a story. One of the challenges in creating models for use in animated features can be balancing the desire for a visually appealing image of a character or other object with the practical issues involved in allocating the computational resources required to produce those visually appealing images. Often the geometric descriptions of objects or models at various stages in a feature film production environment may be rough and coarse, lacking the realism and detail that would be expected of the final production.

Computer generated imagery and animation typically can involve creating models for objects that are elements of a scene. One aspect of creating a model for use in computer generated imagery and animation can be to construct the object in a true 3-dimensional coordinate system. Sometimes, objects can be sculpted, much like real clay or plaster, working from general forms to specific details with various sculpting tools. Often, a model can be created by applying or fitting a topology (e.g., using a mesh of geometrical vertices, faces, and edges) to an object's form.

In a process called rigging, models can be given various controllers, animation variables, and handles for an animator to manipulate various locations of the object's topology to create complex movements and motions. For some models, a bone/joint system can be set up to deform various locations of the object's topology. For example, the bone/joint system can be connected to foot, ankle, knee, hip, and other leg locations of a humanoid model to provide the structure to make the humanoid model walk. Other types of information may also be "hung" on the object's topology to add further realism or additional control for the animator. In other words, information may be associated with a vertex, edge, span, or face of the mesh that forms to the object's topology. However, the above processes can be very involved and time-consuming to simply generate a single model.

Additionally, a typical feature-length animation may require hundreds to thousands of models. This increase the production time and cost of the animation if each model may be required to be hand-created and set up. One possible solution can be to hand copy the information from one model to another. However, this process still requires an animator to place or "hang" the copied data onto the correct position of the new objects topology. Rarely are each characters exactly the same, so each character's topology can have some differences that the animator has to deal with.

One issue with the production process is the time and effort involved when an animator undertakes to create the geometric description of a model and the model's associated animation variables (avars), rigging, shader variables, paint data, or the like. Even with models that lack the detail and realism expected of the final production, it may take several hours to several days for an animator to design, rig, pose, paint, or otherwise prepare the model for a given state of the production process. Further, although the model need not be fully realistic at all stages of the production process, it can be desirable that the animator or artist producing the model be able to modify certain attributes of the model at any stage. However, modifying the model during the production process may also involve significant time and effort. Often, there may not be sufficient time for desired modifications in order to maintain a release schedule.

Accordingly, what is desired are improved methods and apparatuses for solving some of the problems discussed above, while reducing further drawbacks, some of which are discussed above.

BRIEF SUMMARY

In various embodiments, an animator can create or generate a model of an original object. The animator may apply or fit an object representation such as a mesh or point cloud to the object's form to represent the object's topology. Information such as texture, rigging, shader and paint data, hairstyles, and the like, can be attached to or otherwise associated with the object's topology.

In some embodiments, an object representation for a source object can be aligned with any number of object representations for additional objects. Aligning the object representations can include identifying corresponding points on the object representations, such as vertices on respective meshes representing the corners of mouths. In some implementations, such corresponding points are used to apply transformations so that the corresponding points on the object representations align with one another. The alignment allows the information originally associated with the source object (e.g., textures, hair, etc.) to be transferred to another target object using the alignment.

In some embodiments, a method for aligning objects for animation includes obtaining a source object representation representing a source object and a target object representation representing a target object, identifying a category of the source object and a category of the target object, based on the category of the source object and the category of the target object, selecting a feature extraction machine learning model from a set of feature extraction machine learning models for different object categories, providing the source object representation and the target object representation as input to the selected feature extraction machine learning model, generating, by the feature extraction machine learning model, information identifying parts of the source object, information identifying parts of the target object, a shape vector for the source object, and a shape vector for the target object, and generating an aligned target object representation that is aligned with the source object representation and usable for animating the target object, the generating using an alignment machine learning model based on the information identifying parts of the source object, the information identifying parts of the target object, the shape vector for the source object, and the shape vector for the target object.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 5 is a simplified flowchart of a method for aligning object representations, according to some embodiments.

DETAILED DESCRIPTION

Figure 1:
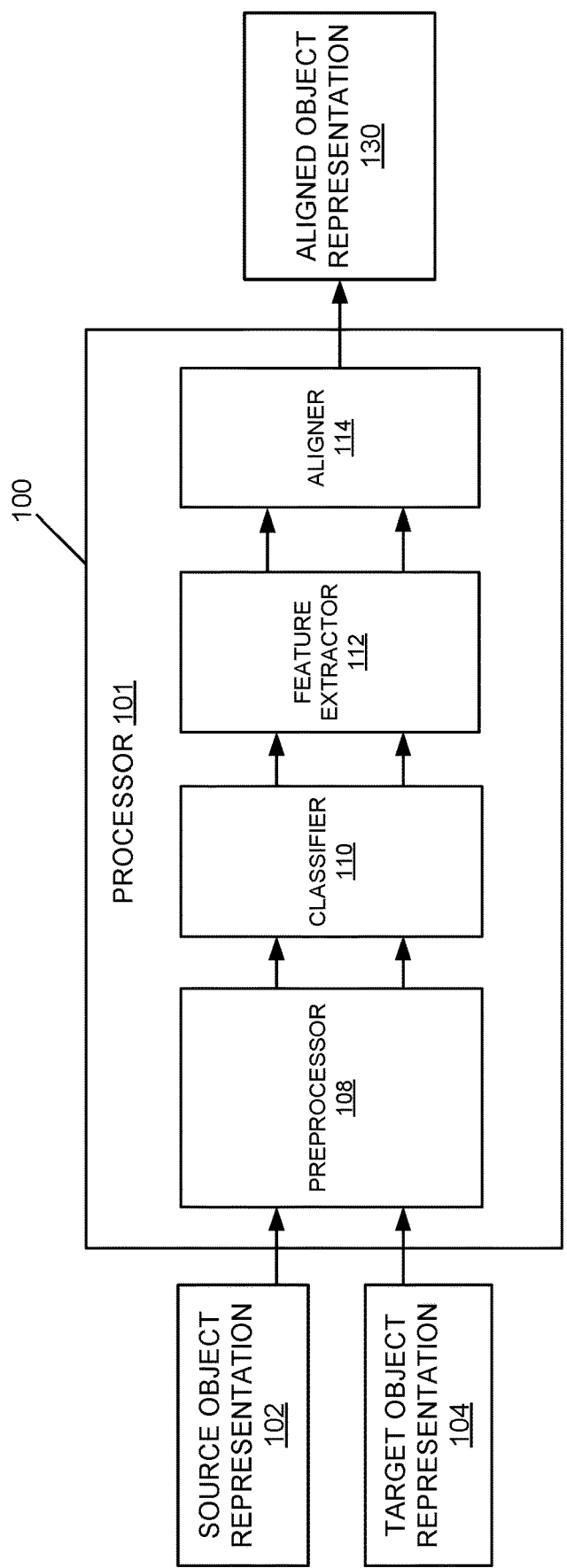
FIG. 1 is a simplified block diagram of an example of a system for aligning object representations according to some embodiments.

Techniques and tools can be implemented that assist in the production of computer animation and computer graphics imagery. An object representation can be a structural representation that gives shape to a model. For example, an object representation can be a mesh specifying vertices and edges, a point cloud, or a three dimensional (3D) volume. Various additional pieces of information are added to an object representation, which can include textures, color information, rigging information, hair information, and so forth.

In various embodiments, point weight groups, shader variables, articulation controls, hair variables and styles, paint data, and the like, can be shared between object representations based on identified correspondences between the objects. Information associated with the object representation of one object can be shared with or transferred to the object representation of another object. In order to share such information, the object representations must be aligned or brought into correspondence. For example, for two meshes representing two cat characters, points on the mesh representing the respective ear tips, pupils, claws, etc. are identified and mapped to one another. Such correspondence information can be used to align the two models so that information can easily be transferred from one to another.

In one example use case, a first 3D model for an object is modified to generate a second 3D model. Specific examples include developing a new 3D human character that is based on a previously generated character, but may include slight changes (e.g., an updated version of the same character) or more significant changes (e.g., a different character with different facial features). The objects can also be very different from each other (e.g., one model is for a horse, the other model is for a table). The first 3D model for the first object may have various information associated with it, like texture maps, hair information, etc. If an animator wants to carry over the information generated for the first object to a second object, the animator would need to know correspondence between various parts of the two objects, such as noses, eyes, etc. For example, an animator may go through a time-consuming process of art directing information related to a character's eyeliner, the ears, lip color, the lip mask, etc. As another example, information for a 3D model of art-directed scenery can be reused. For instance, information associated with a ground plane may establish the relationship of trees to water to valley to mountain. This can be reused for a new scene. Because this information was carefully art-directed, it can save a great deal of time and computational resources if the information can be reused for another object. Alignment of models so that information can be reused is traditionally a time-consuming manual process. Most approaches rely on human-computer interaction, as the computing system needs human guidance to perform alignment. This is typically tedious, as hundreds of landmark points and contours are often needed. The matching problem has traditionally been difficult for a machine to perform without human guidance, as it is unclear what should match what, given that using a representation such as a 3D mesh model, the machine identifies shapes such as triangles and angles, from which it is difficult to assign an object part such as a finger or a foot. The techniques described herein can be used to automate object alignment using a set of machine learning models.

In some embodiments, object representations are obtained, which can be meshes, point clouds, volumes, or any other suitable representation of a 3D object to be animated. The object representations include a source object representation, representing an original model associated with information to be reused (e.g., textures, hair, rigging information, etc.). The object representations also include and a target object representation, representing another model to which the information is to be transferred. The object representations are categorized, using categories of objects such as human, bipedal animal, mountain, tree, horse, canine, etc. This categorization can, for example, be performed using a classifier machine learning model trained to output probabilities of objects being in a particular category. Based on the category, a feature extraction machine learning model is selected. The system can include multiple feature extraction machine learning models, trained to extract semantic and shape features from object representations. These feature extraction models can be specific to a category (e.g., one for humans, one for chairs, etc.). The selected feature extraction machine learning model generates a shape vector quantifying the shape of the object (e.g., for regions of the object and/or the entire object). The feature extraction machine learning model also generates a semantic probability vector characterizing a probability of each point in the object representation corresponding to a particular part of the object (e.g., hand, foot, shoulder, etc.). The shape vectors and the semantic probability vectors are then provided to an alignment model that aligns the source and target image representations, facilitating the transfer of information from the source object to the target object. The combined semantic understanding and correspondence generation allows the system to enrich the training with the human knowledge and automatically assign the landmarks, saving time and computing resources.

I. Pipeline for Alignment

Figure 6:
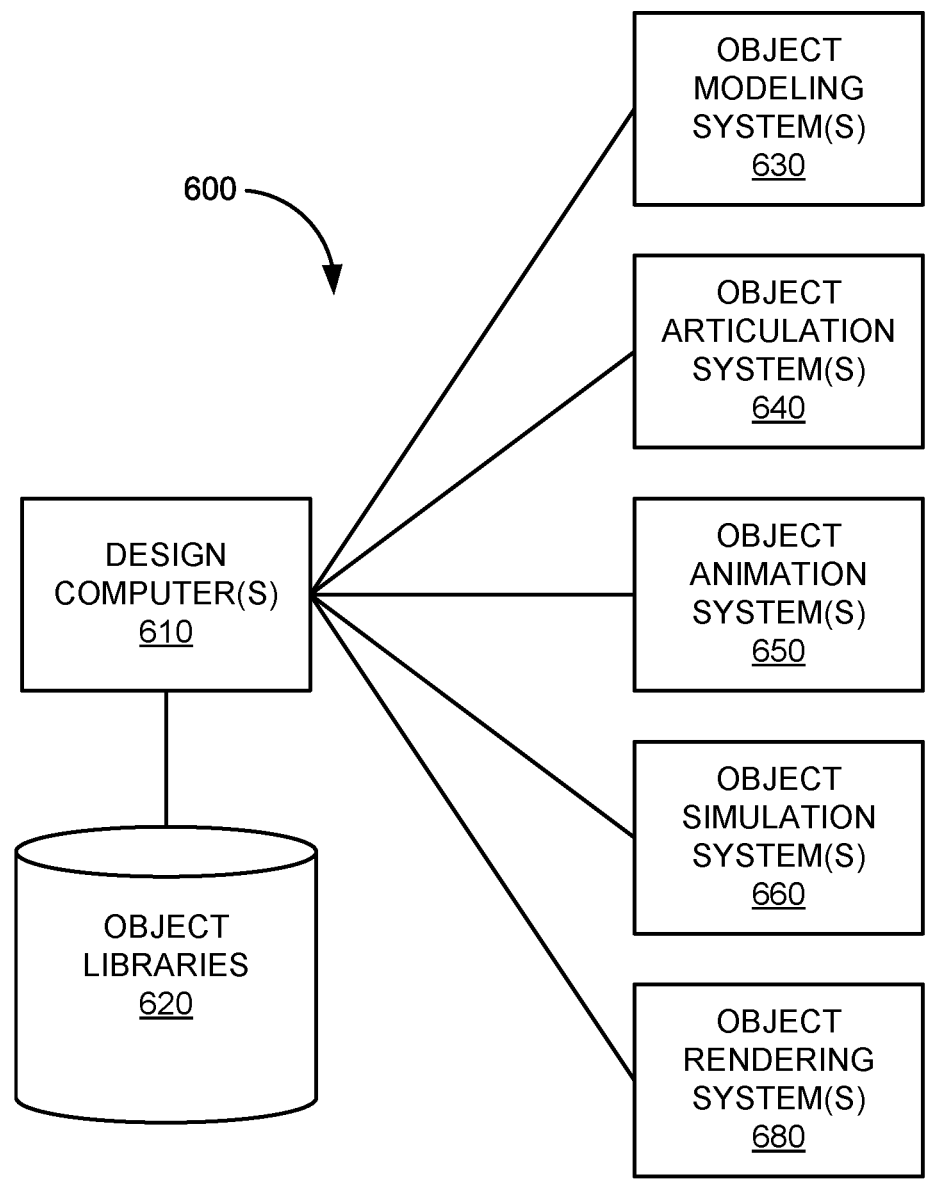
FIG. 6 is a simplified block diagram of a system for creating computer graphics imagery (CGI) and computer-aided animation that may implement or incorporate various embodiments of the present invention.
Figure 7:
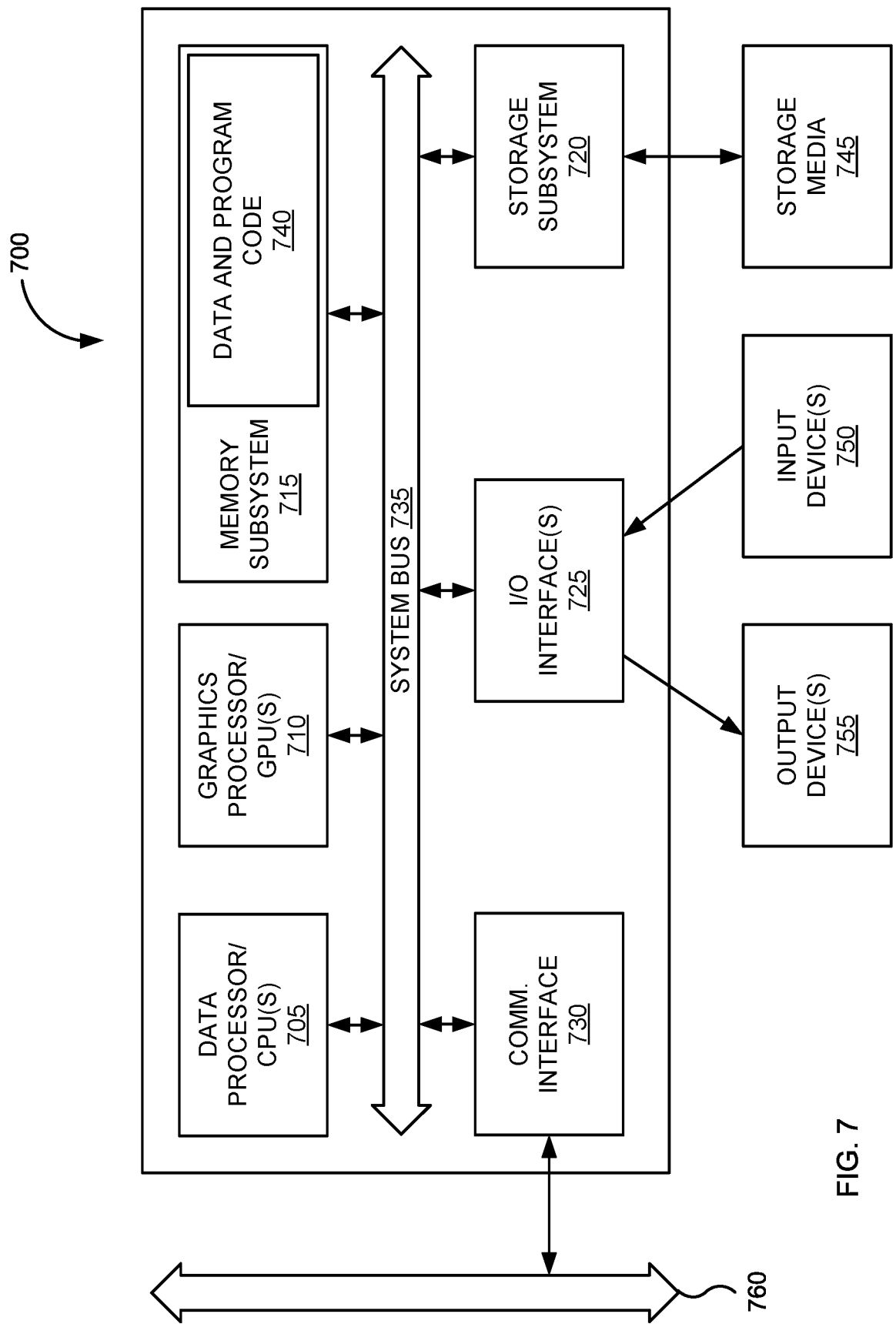
FIG. 7 is a block diagram of a computer system or information processing device that may incorporate an embodiment, be incorporated into an embodiment, or be used to practice any of the innovations, embodiments, and/or examples found within this disclosure.

FIG. 1 simplified block diagram of an example of a computer system 100 for aligning object representations for animation and CGI, according to some embodiments. As shown, the computer system 100 can include a processor 101 configured to implement computer program components, which can include a preprocessor 108, a classifier 110, a feature extractor 112, and an aligner 114. In some implementations, the computer system 100 is part of, or coupled to, systems for animating and rendering objects, as shown in FIGS. 6 and 7. The computer system 100 and its functions may accordingly be part of an overall animation pipeline as further described below with respect to FIGS. 6 and 7.

In some embodiments, the processor 101 obtains object representations including a source object representation 102 and a target object representation 104. The processor 101 may, for example, receive the source object representation 102 and/or the target object representation 104 from a remote computing device (e.g., from a remote animation computer). Alternatively, or additionally, the obtains the source object representation 102 and/or the target object representation 104 from local storage.

An object representation may, for example, include one or more of a mesh, a point cloud, a volume, a 3D model, a color representation, a texture representation, or any other suitable object representation. The source object representation 102 and the target object representation 104 are provided to the preprocessor 108 for processing.

In some embodiments, the preprocessor 108 includes software and/or hardware configured to identify and generate a suitable object representation. For example, the source object representation may obtained in a first form, such as a point cloud, and the target object representation is in a second form, such as a mesh. The preprocessor 108 can identify a form of the source object representation and a form of the target object representation. In some aspects, the preprocessor 108 can convert the source object representation 102 and the target object representation 104 to a third, standardized form, as described herein. The source object representation 102 and the target object representation 104 are provided to the classifier 110 for further processing.

In some embodiments, the classifier 110 includes software and/or hardware configured to identify a category of the source object and a category of the target object. The categories may, for example, identify a type of object such as a person, car, table, monkey, rooster, dog, alien, primate, bipedal animal, quadrupedal animal, and so forth. In some aspects, the classifier 110 is a machine learning model such as a neural network (e.g., a classifier machine learning model). Suitable architecture for a classifier machine learning model is described below with respect to FIG. 2. The source object representation 102 and the target object representation 104 are provided to the feature extractor 112 for further processing.

In some embodiments, the feature extractor 112 includes software and/or hardware configured to assess parts and shapes characterizing the source and target objects based on the source and target object representations. In some aspects, the feature extractor 112 includes a machine learning model such as a neural network (e.g., a feature extraction machine learning model). A suitable architecture for a feature extraction machine learning model is described below with respect to FIG. 3. In some implementations, the feature extractor 112 includes multiple models or branches tailored to different object category pairs (e.g., as identified using the classifier 110). For example, one feature extraction model is for primate-to-human alignment and another feature extraction model is for car-to-car alignment. Based on the source object category and the target object category identified using the classifier 110, the classifier 110 can provide each object representation to a corresponding feature extraction model. The models may be allocated based on different granularities of category, such as human, primate, animal, bipedal animal, and so forth. Thus, a particular feature extraction model can be selected based on the categories determined by classifier 110.

In some aspects, the feature extractor 112 generates, for each of the source and target object representations, information identifying parts of the object and a shape vector. The information identifying the parts of the object can include semantic categories identifying parts of the object such as hands, arms, feet, head, mouth, etc. The shape vectors can describe the shape of the object or parts thereof. For example, the shape vectors can inform about the curvature, sharpness, and so forth, of different parts of the object. The source and target shape vectors and information identifying the object parts are provided to the aligner 114 for further processing.

In some embodiments, the aligner 114 includes software and/or hardware configured to align the target object representation with the source object representation, to generate an aligned object representation 130. In some aspects, the aligner 114 includes a machine learning model such as a neural network (e.g., an alignment machine learning model). A suitable architecture for an alignment machine learning model is described below with respect to FIG. 4. Alternatively, any type of machine learning model could be used. The architecture described below with respect to FIG. 4 has been found particularly effective for this application. The aligner 114 may use the information identifying parts of the target object, the information identifying parts of the source object, the shape vector for the source object, and the shape vector for the target object, to execute an optimization process to match corresponding parts of the source and target objects (e.g., head to head, hand to hand, etc.).

II. Example Models

Figure 2:
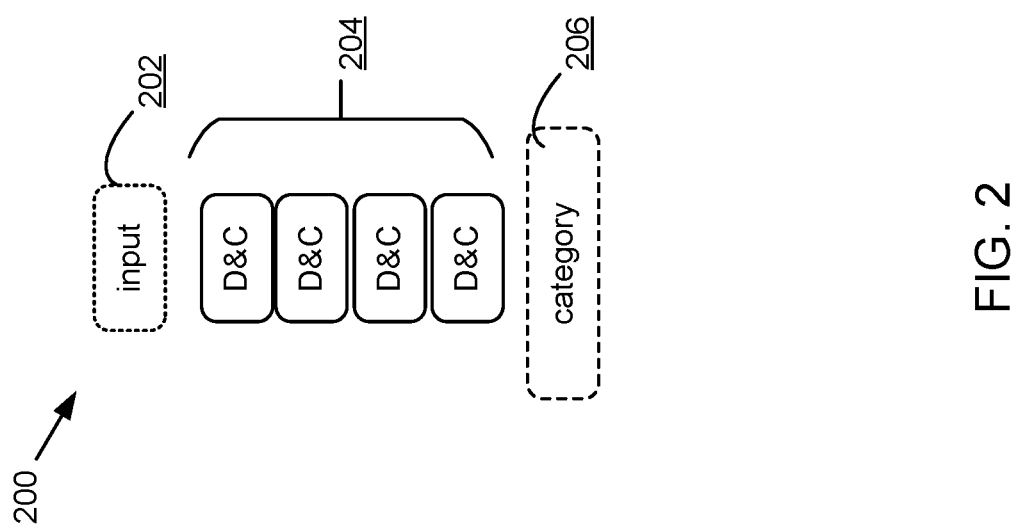
FIG. 2 is a simplified block diagram of an example of a classifier machine learning model, which is part of the system for aligning object representations of FIG. 1, according to some embodiments.
Figure 3:
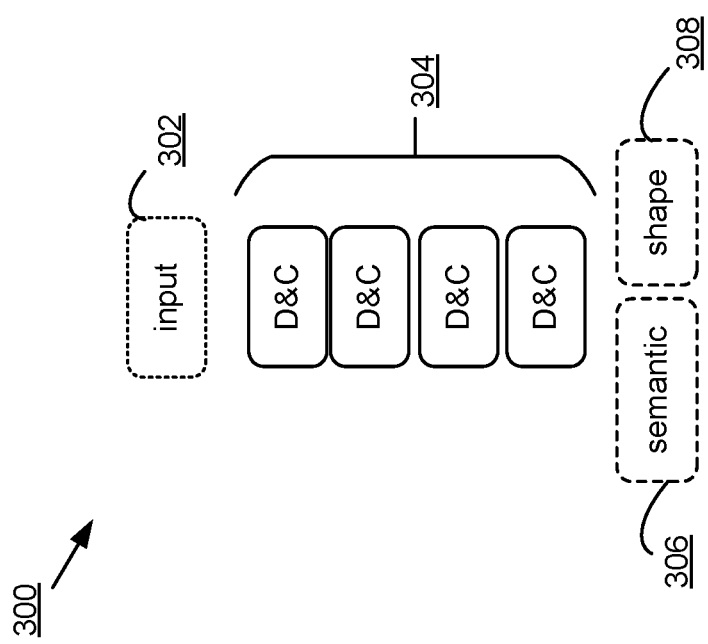
FIG. 3 is a simplified block diagram of an example of a feature extraction machine learning model, which is part of the system for aligning object representations of FIG. 1, according to some embodiments.
Figure 4:
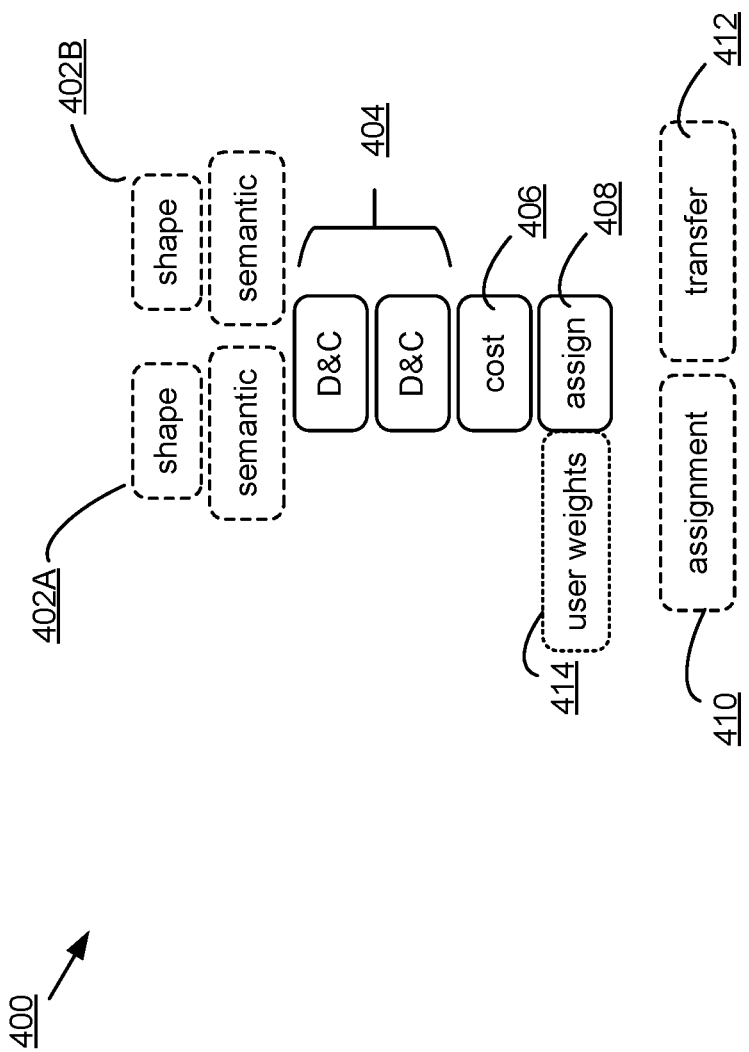
FIG. 4 is a simplified block diagram of an example of an alignment machine learning model, which is part of the system for aligning object representations of FIG. 1, according to some embodiments.

FIGS. 2, 3, and 4 illustrate example architectures for implementing the classifier 110, feature extractor 112, and aligner 114, respectively, of FIG. 1.

A. Classifier Model

FIG. 2 is a simplified block diagram of an example of a classifier machine learning model 200, according to some embodiments. In some implementations, the classifier machine learning model 200 is applied as the classifier 110 of the computer system 100 of FIG. 1. In this example, the classifier machine learning model 200 is a neural network.

As shown in FIG. 2, the classifier machine learning model 200 includes an input layer 202, a plurality of mixed diffusion and convolution layers 204, and a category probability branch 206. The input layer is configured to receive, as input, an object representation (e.g., source object representations and target object representations). The mixed diffusion and convolution layers 204 may perform a diffusion process characterized by a random walk using transition matrix which can be induced by convolution. (See, e.g., Selvi et al., "Diffusion Convolution Recurrent Neural Network—A Comprehensive Survey," 2021 IOP conf. Ser.: Mater. Scie. Eng. 1055 012119 (2021); Sharp et al., "Diffusion is All You Need for Learning on Surfaces," arXiv: 2012.00888v1 (2020)). In this example, the classifier machine learning model 200 includes four mixed diffusion and convolution layers. Alternatively, the classifier machine learning model 200 can include other numbers of mixed diffusion and convolution layers, e.g., two, two or more, six, eight, ten, twelve, or any suitable number of mixed diffusion and convolution layers.

In some implementations, individual points are combined using a kernel function, e.g. averaged, masked, etc. Convolutions may have a matrix shape (e.g., a 7×7 or similarly sized matrix). In diffusion methods or generally belief propagation, this is done by aggregating results on graphs which are not necessarily grid-like, i.e., the layers are not fully connected. This enables operation on any sizes, since the full size is not fixed. Diffusion can operate exactly on the graph, which is the mesh, e.g. the vertices connected with edges, forming the faces and hence the surface.

The category probability branch 206 can include an output layer that outputs probabilities of an object representation corresponding to a particular category of object. For example, for a given input object representation, it may be 94% likely the object is a dog, 89% likely the object is a wolf, 5% likely the object is a fish, and 1% likely the object is a table. This output can, for example, be in the form of a probability vector with elements for object types and corresponding values for the probability of the object being of each respective object type.

B. Feature Extraction Model

FIG. 3 is a simplified block diagram of an example of a feature extraction machine learning model 300, according to some embodiments. In some implementations, the feature extraction machine learning model 300 is applied as the feature extractor 112 of the computer system 100 of FIG. 1. As noted above with respect to FIG. 1, in some embodiments, multiple feature extraction machine learning models 300 can be included in the system, and a particular feature extraction model can be selected based on the object category pair provided from the classifier. Equivalently, a single feature extraction machine learning model 300 with multiple modules can be implemented, where each module can correspond to a different feature extraction module. The object representations can be processed by the modules corresponding to the identified object categories. In the example depicted in FIG. 3, the feature extraction machine learning model 300 is a pretrained neural network with respective branches for generating semantic probabilities and shape vectors.

As shown in FIG. 3, the feature extraction machine learning model 300 includes an input layer 302, a plurality of mixed diffusion and convolution layers 304, and two branches: a semantic probability branch 306 and a shape vector branch 308. Each layer connects to the next layer, so the last diffusion layers connect to the convolutions layers, and the subsequent per branch convolution layers are connected to these. The input layer is configured to receive, as input, an object representation (e.g., source object representations and target object representations). In this example, the feature extraction machine learning model 300 includes exactly four mixed diffusion and convolution layers. Alternatively, the feature extraction machine learning model 300 can include other numbers of mixed diffusion and convolution layers, e.g., two, two or more, six, eight, ten, twelve, or any suitable number of mixed diffusion and convolution layers. The feature extraction machine learning model 300 may further include one or more assignment layers. For example, a first assignment layer is inside the network where the best match is greedily selected (i.e., locally), and a second assignment layer is disposed after the neural network is finished, to perform another optimization to assign the best match also considering other matches (i.e., globally).

The semantic probability branch 306 is configured to generate semantic information identifying parts of the objects. For example, each point (e.g., vertex, edge face, or other units of the 3D model) is assigned a probability of being in each of a list of parts. The semantic probability branch 306 can include an output layer that outputs information identifying parts of the objects (e.g., for the source object and for the target object). This can be based on a set of predetermined object parts. Parts of the object may vary depending on the object type. For example, a car includes wheels, lights, windshield, bumpers, etc.; a dog includes ears, nose, mouth, paws, tail, etc. The information identifying parts of the source object generated by the semantic probability branch 306 may, for example, be in the form of a semantic probability vector. The semantic probability vector can include elements for parts of a given object (e.g., a point or set of points of the object) and values for the probability of a portion of the object being part of each respective object part. For example, a particular point in an object representation is 10% likely to be in the hand, 70% likely to be in the arm, 15% likely to be in the leg, 5% likely to be in the head, and so forth. Elements in the semantic probability vector can be mapped to predefined parts, with a probability for each part stored therein. In some examples, the semantic probability vector is a per-item vector. For example, multiple vectors, each corresponding to items such as vertices, edges, faces, or other units of the 3D model, are established and combined into a matrix, where each row is a vector for each item.

The shape vector branch 308 is configured to identify probabilities associated with object shape. The shape vector branch 308 can include an output layer that outputs shape vectors that identify shape information associated with an object. For example, a shape vector can include entries corresponding to different shape characteristics, such as curvature, sharpness, smoothness, and so forth. In some examples, the shape vector defines a set of characteristics for each point of the objects (e.g., the source object and the target object). For example, a particular point on the source object may have a curvature of 0 on a scale from 0 to 1, indicating it is flat. An example shape vector can include a 0 for an element associated with curvature for that point, and other numbers defining learned shape characteristics in corresponding elements.

C. Alignment Model

FIG. 4 is a simplified block diagram of an example of an alignment machine learning model 400, according to some embodiments. In some implementations, the alignment machine learning model 400 is applied as the aligner 114 of the computer system 100 of FIG. 1. In this example, the alignment machine learning model 400 is a neural network.

As shown in FIG. 4, the alignment machine learning model 400 may include two input branches, a semantic probability branch 402A and a shape vector branch 402B, a set of mixed diffusion and convolution layers 404, a cost optimization layer 406, and an application-dependent assignment layer 408.

The semantic probability branch 402A is configured to receive, as input, semantic probability vectors generated by the feature extraction machine learning model 300. The shape vector branch 402B, is configured to receive, as input, shape vectors generated by the feature extraction machine learning model 300.

In the example depicted in FIG. 4, the alignment machine learning model 400 includes two mixed diffusion and convolution layers 404, although any number N of mixed diffusion and convolution layers 404 can be implemented.

The cost optimization layer 406 optimizes a best match based on costs for each match. For example, each vertex on mesh 1 and a vertex on mesh 2, which is represented as a cost matrix. The cost optimization layer 406 then optimizes the best match. Each point in one model is assigned to a corresponding point in another model. As shown in FIG. 4, a set of diffusion and convolution layers combine the 4 vectors into a cost matrix.

The application-dependent assignment layer 408 is configured to assign types of object pairs. For example, a simple greedy local approach finds the lowest match per point, ignoring all the neighboring points. Or, a global approach that considers other points is applied to select different matches that lowers the overall cost. In some examples, the Hungarian algorithm is used for the assignment, although other algorithms could be used. The application-dependent layer 408 may, for example, assign cars to cars, or humans to rooms. The assignment can be performed based on user-configured weights, as described herein. For example, the application-dependent assignment layer 408 combines the user weights with the optimized cost and the actual task. Each match can be weighed with the cost and the user weights to indicate user preferences.

In some implementations, user-configured weights 414 can be applied at the application-dependent assignment layer 408. These weights 414 can be used to allow a user to customize how points in the source object are linked to points in the target object. For example, a user can establish a link between a human hand and a portion of a physical object so that the user touches that portion of the physical object when interacting with it.

The output of the alignment machine learning model 400 can include assignments 410, which establish correspondences between points of the source object and points on the target object. For example, a set of points in the nose of the target object is identified as corresponding to a set of points in the nose of the source object. Alternatively, or additionally, the output of the alignment machine learning model 400 can include transfers 412 to the target object. For example, based on the assignments 401, transformations are applied to the target object so that the nose of the target object lines up with the nose of the source object, the elbows line up, and so forth.

In some embodiments, one or more of the machine learning models are pretrained using unsupervised and/or supervised learning techniques. The computer system obtains training data, which may be labeled and/or unlabeled. For example, the computing system generates labels for different parts of the objects. As a specific example, for humans, labels may indicate probabilities of points corresponding the arms, the hands, etc. In some implementations, the set of machine learning models is trained end-to-end on partially known groundtruth data but also on unsupervised learning of the alignment. Experiments showed that a combination of such data provides the best results. Each model is provided corresponding object representations, and generates output. The computer system computes loss functions based on the output generated by the models and the training data. The computer system updates parameters of the neural network to minimize the loss functions. Any suitable loss functions may be used. For example, the loss functions include a mean square error loss, which takes the mean of the square of the per point difference between probabilities of the training data and the model output during training time.

The computing system may update the parameters of the neural networks by adjusting weights corresponding to respective nodes of the neural networks. Weights associated with the nodes are updated according to the minimized loss. In some implementations, the computer system uses backpropagation to trace the loss back from the output layer through the intermediate layers of the neural network to the input layer. The values of the weights associated with the connections between the nodes in the neural network are thereby updated. The error is backpropagated through the layers by adjusting the weights associated with connections of nodes at each layer. This process is repeated until the output error is below a predetermined threshold. The trained models can then be used to perform alignment.

III. Method of Alignment

FIG. 5 is a simplified flowchart of a method 500 for aligning object representations, according to some embodiments. The method 500 can be used to align a source object representation with a target object representation. As described above, object alignment can be leveraged to reuse information generated for one model for another model. The alignment of the object representations can be used to transfer any kind of properties associated with the source object onto the target object, such as texture maps, maps of rigging weights, and so forth.

The method presented in FIG. 5 and described below is intended to be illustrative and non-limiting. It is appreciated that the processing steps may be performed in an order different from that depicted in FIG. 5 and that not all the steps depicted in FIG. 5 need be performed. In certain implementations, the method 500 may be implemented by a computer system, such as the computer system 100 shown in FIG. 1 and/or those shown in FIGS. 6 and 7.

In some embodiments, the method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At step 502, the computer system obtains a source object representation representing a source object and a target object representation representing a target object. As described above with respect to FIG. 1, the object representations can take various forms such as a mesh, a point cloud, a volume, and so forth. The computer system may, for example, receive the source object representation and/or the target object representation from another device (e.g., from a remote computer that generated the source object representation and/or the target object representation), or retrieve the object representations from local storage.

In some embodiments, the computer system obtains the source object representation in a first form and the target object representation in a second form, and converts the object representations to a third form. For example, the first object representation and the second object representation can each be of various forms including a point cloud, a mesh, and a volume. The first object representation can be in the same format as the second object representation (e.g., both are meshes, both are point clouds, etc.). Alternatively, the first object representation can be in a different format from the second object representation (e.g., the source object representation is in the form of a polygonal mesh, and the target object representation is a non-uniform rational B-spline (NURBS) model). The computer system may identify the respective forms of the object representations. For example, the computer system analyzes file extensions, text, or metadata associated with respective files to identify the forms. As a specific example, the computer system receives the source object representation as an ".ply" file, and based on the file extension, determines that the source object representation is a polygonal mesh. Upon identifying the respective forms of the source and target object representations, the computing system identifies and applies appropriate transformations to convert the source and target representations into the third form. In some aspects, the third form is a representation that describes points and how the points relate to surrounding points. The preprocessor can directly extract such point and relationship information from some representations (e.g., point clouds). For other representations, the preprocessor may execute algorithms to identify relationships between the points, which can include finding the nearest points, identifying surface information, clustering, and so forth. Examples of suitable algorithms for identifying the relationships between the points include a k-Nearest Neighbor (kNN) search (See, e.g., Christopher, "K-Nearest Neighbor," Medium, available at https://medium.com/sw1h/k-nearest-neighbor-ca2593d7a3c4 (2021)) and a k-Dimensional (k-D) Tree (See, e.g., "KD Trees," Open DSA, available at https://opendsa-server.cs.vt.edu/OpenDSA/Books/CS3/html/KDtree.html #(2021)). The source and target object representations, in the third form, can then be further processed. Alternatively, in some implementations, the source and target object representations can be processed in the form received (e.g., mesh, point cloud, etc.).

At step 504, the computer system identifies a category of the source object and a category of the target object. In some embodiments, the categories are identified using a classifier machine learning model. As described above with respect to FIG. 2, the classifier machine learning model can be a neural network. In some embodiments, the classifier machine learning model is a neural network that includes an input layer for accepting an object representation corresponding to an object (e.g., the source object representation and the target object representation), two or more mixed diffusion and convolution layers; and an output layer for outputting a probability that the object is part of a particular category of objects. The classifier machine learning model may, for example, generate category probabilities indicating a likelihood that each of the source object and the target object belongs in that category. In some implementations, the output of the classifier machine learning model is a category probability vector for the source object and a category probability vector for the target object. For example, the category probability vector for the source object indicates that the source object is 75% likely to be a dog, 25% likely to be a wolf, and so forth, as described above with respect to FIG. 2. In some aspects, the category with the highest probability (e.g., dog in this example) is identified as the category of the object. Additional examples of categories that may be identified for the source object and/or the target object include a human, a particular non-human species of animal, a biped, a quadruped, a set prop, furniture, a tool, and so forth.

Alternatively, or additionally, the computing system can identify the object types using other types of machine learning models or input. For example, the computing system may analyze the file names, file extensions, data, or metadata, of the input object representations to learn the object types. As another example, the object types can be specified by a user (e.g., via input to a user interface).

At step 506, based on the category of the source object and the category of the target object, the computing system selects a feature extraction machine learning model from a set of feature extraction machine learning models for different object categories. As described above with respect to FIGS. 1 and 2, the computing system can include multiple different feature extraction machine learning models, each tailored to a particular category pair of source object and target object, such as horse-to-horse or table-to-chair. The categories can be broad (e.g., animal, furniture), medium (e.g., primate, bipedal animal), or narrow (e.g., human, rabbit). Thus, in some implementations, feature extraction is performed using use a network specifically trained for alignment between monkeys and humans instead of a generic model. Using a model specific to the context can produce more accurate alignment as well as increase speed of execution.

Based on the categories generated by the classifier machine learning model, the computing system selects a feature extraction machine learning model for the source object representation and a feature extraction machine learning model for the target object representation. Selection of the model can, for example, be done by traversing mappings of object category pairs to feature extraction machine learning models.

At step 508, the computing system provides the source object representation and the target object representation as input to the selected feature extraction machine learning model. As described above with respect to step 508, the source object representation and the target object representation may be provided to the same feature extraction machine learning model or different feature extraction machine learning models based on their object types. As noted above with respect to FIGS. 1 and 2, each feature extraction model can be a neural network with two branches that generates both a semantic probability and a shape vector for each object representation processed. For example, each feature extraction machine learning model is a neural network that includes an input layer for accepting an object representation corresponding to an object, two or more mixed diffusion and convolution layers (e.g., four mixed diffusion and convolution layers, as shown in FIG. 3), a first branch that generates information identifying parts of the object, and a second branch that generates a shape vector describing a shape of the object.

At step 510, the feature extraction machine learning model generates information identifying parts of the source object, information identifying parts of the target object, a shape vector for the source object, and a shape vector for the target object. As noted above, the feature extraction machine learning models take as input an object representation which is processed by two branches of the feature extraction machine learning model to generate information identifying parts of the object (e.g., a semantic representation) and a shape vector. This is performed for each of the source object representation, to generate information identifying parts of the source object and a shape vector for the source object, and for the target object representation, to generate information identifying parts of the target object and a shape vector for the target object.

The shape vectors (e.g., the shape vector for the source object and the shape vector for the target object) can include numerical representations of various shape descriptors, such as a size of at least a portion of the source object, a volume of at least a portion of the source object, a curvature of at least a portion of the source object, a length of at least a portion of the source object, and so forth. Each respective shape vector may include a descriptor of the shape of an area of the object. This can be for each point or group of points in the respective object representations.

The information identifying parts of the objects (e.g., the information identifying parts of the source object and information identifying parts of the target object) can include a probability, for each point in each object representation, of that point being in one or more predefined object parts. For example, for humans, the predefined parts may include head, hand, shoulders, feet, etc. For a given point, the information identifying the parts of a given object may specify a probability for the point being part of the head, a probability for the point being part of the shoulder, a probability for the point being part of the foot, and so forth.

At step 512, the computing system generates an aligned target object representation. For example, the computing system generates the aligned target object representation using an alignment machine learning model based on the information identifying parts of the source object, the information identifying parts of the target object, the shape vector for the source object, and the shape vector for the target object. As described above with respect to FIGS. 1 and 4, the alignment machine learning model can be a model such as a neural network which has been trained to generate alignment information for a pair of objects. The computing system provides, to the alignment machine learning model as input, the information identifying parts of the source object, the information identifying parts of the target object, the shape vector for the source object, and the shape vector for the target object.

In some examples, the alignment machine learning model optimizes over the information identifying parts of the source object, the information identifying parts of the target object, the shape vector for the source object, and the shape vector for the target object to find similarities in shape as well as semantics. This process may be part of a deep learning framework to find an optimal alignment. For example, for a 3D model corresponding to a humanoid character, the semantic categories may include but are not limited to hands, arms, legs, feet, head, mouth, etc., which describe the various body parts. The shape descriptions may inform about the size, volume, curvature, length, etc. of the respective different parts of the body. The matching then optimizes to match between the similarities, as for example head to head, hand to hand, etc. which may be of different shape, e.g. left hand vs right hand. In some cases the shape description is more dominant than the semantic description, or vice versa. The alignment machine learning model may identify point-to-point correspondences between points in the source object and the target object. This may be a one-to-one, or one-to-many, or any suitable correspondence between the point sets.

In some examples, the alignment machine learning model identifies similarities between the two shape vectors and the two semantic vectors. For example, the source object corresponds to a human and the source object representation is made up of 10,000 points. The target object corresponds to a monkey and the source object representation is made up of 5,000 points. The computing system generates a 5,000 by 10,000 matrix representing the objects. The alignment machine learning model performs optimization to determine correspondences between points in the respective objects, which can be quantified as a probability that each point of the source object corresponds to a particular point on the target object, which is determined by the four input vectors. The alignment subsystem may compute a difference matrix based on the differences of the vectors, which is optimized to identify corresponding points. By determining the distances and adding them up, the alignment subsystem can determine a likelihood of each pair of points corresponding. This can result in assignments establishing a part of the object that each point corresponds to (e.g., part of the lip). As one example, for a given point on the source representation, based on the likelihood of correspondences, the alignment subsystem calculates the entropy over one row, which corresponds to how many points on the target representation match that point (e.g., indicating a one-to-many correspondence). As another example, a point on the source representation may match a point on the target representation with other points having a 0% match likelihood, indicating a one-to-one correspondence.

In some embodiments, the alignment machine learning model outputs an aligned target object representation that is aligned with the source object representation and usable for animating the target object. In some aspects, the aligned target object representation is based on a transformation between the source object representation and the target representation, so that the target object representation matches up with the source object representation (e.g., fingertip to fingertip, pupil to pupil, toe to toe, etc.). Alternatively, or additionally, the aligned target object representation is a topological correspondence, which can include functions, relationships, correlations, etc. between one or more points associated with the first object representation and one or more points associated with the second object representation. The topological correspondence may include a mapping from every location on or within a space near the first object representation to a unique location on or near the second object representation. A correspondence may be generated between points of the source object representation (e.g., vertexes a portion of a first mesh) and corresponding points in the target object representation (e.g., corresponding vertices in a portion of a second mesh). The correspondence may map one or more points, curves, surfaces, regions, objects, or the like, associated with the source object to one or more points, curves, surfaces, regions, objects, or the like associated with the second target. In some aspects, the alignment subsystem applies classical geometric processing to transform the points of the target object based on points of the target object representation. This can be based on constraints (e.g., to enforce smoothness). Alternatively, or additionally, a subnetwork (e.g., a neural network) trained to align the objects can be implemented to align the object representations based on the identified correspondences.

In some aspects, the computing system applies information to the aligned target object representation to provide functional and/or decorative purposes. The computing system identifies information defined at locations of the source object representation, such as textures, rigging, and so forth, and modifies the aligned target object representation based on the information defined at the locations of the source object representation. For example, the aligned target object may be connected to skeletons, character rigging, or other animation controls and avars used to animate, manipulate, or deform the model via the aligned target object representation. Further, fields of data and/or variables specifying color, shading, paint, texture, etc., can be located at certain vertices or defined over surfaces of aligned target object representation. In some aspects, such information is reused from the source object representation and applied to the aligned target object representation (e.g., to generate a modified aligned target object representation). For example, the computing system applies a texture for the source object representation to the aligned target object representation. The computing system then uses the modified aligned target object representation with the texture to generate computer generated imagery such as an animation frame of the target object.

In various embodiments, transfer of character rigging can be achieved with weight fields. Using the standard topology, the exact weighting of an original form is transferred to a new form using topological correspondence provided by fitting the standard topology to the new form. Shading can include scalar fields, which are also weight fields that can be transferred topologically. Additionally, UV sets can be transferred using topological correspondence.

In further embodiments, painting can be transferred using topological correspondence. In one example, painting data can be incorporated into UV sets, which are transferred between characters. Thus, painted portions of one character can be reused on others.

In some embodiments, hair can be created using scalp meshes. Hairstyles can be transferred between characters as the scalp meshes can be fitted topologically. This projection of information allows the scalp meshes to automatically readjust the new form, while maintaining the originally sculpted hairstyle.

A collision system may use a hand crafted weight response to colliding objects, which can be transferred to other objects. In some examples, extra geometry can be created for a character, such as collision bodies. The extra geometry can be built once, and transferred to other characters using topological correspondence.

In various embodiments, transferred information can be "auto-fitted." For example, due to volumetric differences between objects, skeletons, joints, character rigging and the like can automatically readjust in response the volumetric differences. Accordingly, any information that can be "hung" on the object representation can be transferred.

In some embodiments, the aligned target object representation is used to animate the target object. The computing system can use the aligned target object representation (e.g., with the modifications described above) to generate computer generated imagery such as one or more animation frames. For example, if the aligned target object representation is a mesh, motion of a model associated with the mesh may be realized by controlling the mesh. Polygons and vertices of the mesh may be individually animated by moving their location in space (x, y, z) for each displayed frame of a computer animation. Polygons and vertices of the mesh may also move together as group, maintaining constant relative position. Thus, for example, by raising vertices of the mesh by appropriate amounts at the corners of lips on the head of a human character, a smiling expression can be formed. Similarly, vertices of a mesh located at or near features or other prominent aspects of the model created by the mesh, such as eyebrows, cheeks, forehead, etc., may be moved to deform the head of the human character to form a variety of expressions. Similarly, point cloud, volume, or other types of object representations, can be used to used to animate the aligned target object.

As discussed above, constructing an object representation and placing all of this information on the object representation can be a time-consuming process. This process may limit how many characters or other objects may be created, the topologies and geometries of those models, and what changes can be made during various stages in the production of animations, such as feature-length films. By aligning the target object representation with the source object representation, much of this labor-intensive work can be reused, which can save a great deal of time and computing resources and make more complex animations possible by virtue of these savings.

In some aspects, the correspondence between the meshes can be guided by a user to direct creative decisions. For example, for characters across species, a matching between feet and rear paws may be suitable, e.g. for human (biped) to dog (quadruped) alignment. Other examples include matching valleys to rivers, cupboards to walls, couches to tables, and so forth depending on the creative content. This is realized as a weighting component, as shown in FIG. 4. This weighting shifts the default semantic and shape alignment—learned from the data—to one which also follows the artistic direction. For example, the computing system identifies one or more user-defined weights and bases the alignment on the weight(s). As a specific example, an animator wants to identify correspondences between left hands in a human and handles of chairs. This can be used for applications such as gaming, to direct where the human model touches the handles of the chair model. As another example, to determine where a person sits in a room, a correspondence can be established between a part of the surface of the couch and the person's behind. A user can configure weights to enforce such correspondences between different types of objects, or the same types of objects, as desired. In some aspects, the weights are learned as default and can be adjusted based on user-defined parameters if desired.

In some aspects, the computing system can create composites of multiple object representations. This can be achieved by repeating the process described above, e.g., with input of the source object representation or aligned target object representation and a third object representation. Due to the automatic nature of the method 500, the computing system align any number of object representations (e.g., three, four, five, ten, or more 3D assets), which would be economically infeasible otherwise due to the traditional manual nature of asset alignment.

IV. Computer Systems

FIG. 6 is a simplified block diagram of system 600 for creating computer graphics imagery (CGI) and computer-aided animation that may implement or incorporate various embodiments. In this example, system 600 can include one or more design computers 610, object library 620, one or more object modeling systems 630, one or more object articulation systems 640, one or more object animation systems 650, one or more object simulation systems 660, and one or more object rendering systems 670. Any of the systems 630-670 may be invoked by or used directly by a user of the one or more design computers 610 and/or automatically invoked by or used by one or more processes associated with the one or more design computers 610. Any of the elements of system 600 can include hardware and/or software elements configured for specific functions.

The one or more design computers 610 can include hardware and software elements configured for designing CGI and assisting with computer-aided animation. Each of the one or more design computers 610 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 610 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 610 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 610 acting as an articulator may employ one or more systems or tools to design, create, or modify controls or animation variables (avers) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 610 acting as an animator may employ one or more systems or tools to specify motion and position of one or more objects over time to produce an animation.

Object library 620 can include elements configured for storing and accessing information related to objects used by the one or more design computers 610 during the various stages of a production process to produce CGI and animation. Some examples of object library 620 can include a file, a database, or other storage devices and mechanisms. Object library 620 may be locally accessible to the one or more design computers 610 or hosted by one or more external computer systems.

Some examples of information stored in object library 620 can include an object itself, metadata, object geometry, object topology, rigging, control data, animation data, animation cues, simulation data, texture data, lighting data, shader code, or the like. An object stored in object library 620 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 630 can include hardware and/or software elements configured for modeling one or more objects. Modeling can include the creating, sculpting, and editing of an object. In various embodiments, the one or more object modeling systems 630 may be configured to generated a model to include a description of the shape of an object. The one or more object modeling systems 630 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 630 may further generate model data (e.g., 2D and 3D model data) for use by other elements of system 600 or that can be stored in object library 620. The one or more object modeling systems 630 may be configured to allow a user to associate additional information, metadata, color, lighting, rigging, controls, or the like, with all or a portion of the generated model data.

The one or more object articulation systems 640 can include hardware and/or software elements configured to articulating one or more computer-generated objects. Articulation can include the building or creation of rigs, the rigging of an object, and the editing of rigging. In various embodiments, the one or more articulation systems 640 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 640 may further generate articulation data (e.g., data associated with controls or animations variables) for use by other elements of system 600 or that can be stored in object library 620. The one or more object articulation systems 640 may be configured to allow a user to associate additional information, metadata, color, lighting, rigging, controls, or the like, with all or a portion of the generated articulation data.

The one or more object animation systems 650 can include hardware and/or software elements configured for animating one or more computer-generated objects. Animation can include the specification of motion and position of an object over time. The one or more object animation systems 650 may be invoked by or used directly by a user of the one or more design computers 610 and/or automatically invoked by or used by one or more processes associated with the one or more design computers 610.

In various embodiments, the one or more animation systems 650 may be configured to enable users to manipulate controls or animation variables or utilized character rigging to specify one or more key frames of animation sequence. The one or more animation systems 650 generate intermediary frames based on the one or more key frames. In some embodiments, the one or more animation systems 650 may be configured to enable users to specify animation cues, paths, or the like according to one or more predefined sequences. The one or more animation systems 650 generate frames of the animation based on the animation cues or paths. In further embodiments, the one or more animation systems 650 may be configured to enable users to define animations using one or more animation languages, morphs, deformations, or the like.

The one or more object animations systems 650 may further generate animation data (e.g., inputs associated with controls or animations variables) for use by other elements of system 600 or that can be stored in object library 620. The one or more object animations systems 650 may be configured to allow a user to associate additional information, metadata, color, lighting, rigging, controls, or the like, with all or a portion of the generated animation data.

The one or more object simulation systems 660 can include hardware and/or software elements configured for simulating one or more computer-generated objects. Simulation can include determining motion and position of an object over time in response to one or more simulated forces or conditions. The one or more object simulation systems 660 may be invoked by or used directly by a user of the one or more design computers 610 and/or automatically invoked by or used by one or more processes associated with the one or more design computers 610.

In various embodiments, the one or more object simulation systems 660 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 660 may be used to simulate the behavior of objects, such as hair, fur, and cloth, in response to a physics model and/or animation of one or more characters and objects within a computer-generated scene.

The one or more object simulation systems 660 may further generate simulation data (e.g., motion and position of an object over time) for use by other elements of system 600 or that can be stored in object library 620. The generated simulation data may be combined with or used in addition to animation data generated by the one or more object animation systems 650. The one or more object simulation systems 660 may be configured to allow a user to associate additional information, metadata, color, lighting, rigging, controls, or the like, with all or a portion of the generated simulation data.

The one or more object rendering systems 670 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 670 may be invoked by or used directly by a user of the one or more design computers 610 and/or automatically invoked by or used by one or more processes associated with the one or more design computers 610. One example of a software program embodied as the one or more object rendering systems 670 can include PhotoRealistic RenderMan, or PRMan, produced by Pixar Animations Studios of Emeryville, California.

In various embodiments, the one or more object rendering systems 670 can be configured to render one or more objects to produce one or more computer-generated images or a set of images over time that provide an animation. The one or more object rendering systems 670 may generate digital images or raster graphics images.

In various embodiments, a rendered image can be understood in terms of a number of visible features. Some examples of visible features that may be considered by the one or more object rendering systems 670 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 670 may further render images (e.g., motion and position of an object over time) for use by other elements of system 600 or that can be stored in object library 620. The one or more object rendering systems 670 may be configured to allow a user to associate additional information or metadata with all or a portion of the rendered image.

FIG. 7 is a block diagram of computer system 700. FIG. 7 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 700 and any of its components or subsystems can include hardware and/or software elements configured for performing methods described herein.

Computer system 700 may include familiar computer components, such as one or more one or more data processors or central processing units (CPUs) 705, one or more graphics processors or graphical processing units (GPUs) 710, memory subsystem 715, storage subsystem 720, one or more input/output (I/O) interfaces 725, communications interface 730, or the like. Computer system 700 can include system bus 735 interconnecting the above components and providing functionality, such connectivity and inter-device communication The one or more data processors or central processing units (CPUs) 705 can execute logic or program code or for providing application-specific functionality. Some examples of CPU(s) 705 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 710 can execute logic or program code associated with graphics or for providing graphics-specific functionality. GPUs 710 may include any conventional graphics processing unit, such as those provided by conventional video cards. In various embodiments, GPUs 710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 710 may include any number of registers, logic units, arithmetic units, caches, memory interfaces, or the like.

Memory subsystem 715 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 715 can include data and program code 740.

Storage subsystem 720 can also store information using machine-readable articles, information storage devices, or computer-readable storage media. Storage subsystem 720 may store information using storage media 745. Some examples of storage media 745 used by storage subsystem 720 can include floppy disks, hard disks, optical storage media such as CD-ROMS, DVDs and bar codes, removable storage devices, networked storage devices, or the like. In some embodiments, all or part of data and program code 740 may be stored using storage subsystem 720.

The one or more input/output (I/O) interfaces 725 can perform I/O operations. One or more input devices 750 and/or one or more output devices 755 may be communicatively coupled to the one or more I/O interfaces 725. The one or more input devices 750 can receive information from one or more sources for computer system 700. Some examples of the one or more input devices 750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 750 may allow a user of computer system 700 to interact with one or more non-graphical or graphical user interfaces to enter a comment, select objects, icons, text, user interface widgets, or other user interface elements that appear on a monitor/display device via a command, a click of a button, or the like.

The one or more output devices 755 can output information to one or more destinations for computer system 700. Some examples of the one or more output devices 755 can include a printer, a fax, a feedback device for a mouse or joystick, external storage systems, a monitor or other display device, a communications interface appropriately configured as a transceiver, or the like. The one or more output devices 755 may allow a user of computer system 700 to view objects, icons, text, user interface widgets, or other user interface elements. A display device or monitor may be used with computer system 700 and can include hardware and/or software elements configured for displaying information.

Communications interface 730 can perform communications operations, including sending and receiving data. Some examples of communications interface 730 may include a network communications interface (e.g. Ethernet, Wi-Fi, etc.). For example, communications interface 730 may be coupled to communications network/external bus 760, such as a computer network, a USB hub, or the like. A computer system can include a plurality of the same components or subsystems, e.g., connected together by communications interface 730 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 700 may also include one or more applications (e.g., software components or functions) to be executed by a processor to execute, perform, or otherwise implement techniques disclosed herein. These applications may be embodied as data and program code 740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 715 and/or storage subsystem 720.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for aligning objects for computer generated imagery, the method comprising performing, by a computer system:
    obtaining a source object representation representing a source object and a target object representation representing a target object;
    identifying a category of the source object and a category of the target object, wherein identifying the category of the source object and identifying the category of the target object comprises providing the object representations to a classifier machine learning model, wherein the classifier machine learning model is a neural network comprising:
        an input layer for accepting an object representation corresponding to an object;
        two or more mixed diffusion and convolution layers; and
        an output layer for outputting a probability that the object is part of a particular category of objects;
    based on the category of the source object and the category of the target object, selecting a feature extraction machine learning model from a set of feature extraction machine learning models for different object categories;
    providing the source object representation and the target object representation as input to the selected feature extraction machine learning model;
    generating, by the feature extraction machine learning model, information identifying parts of the source object, information identifying parts of the target object, a shape vector for the source object, and a shape vector for the target object; and
    generating an aligned target object representation that is aligned with the source object representation and usable for animating the target object, the generating using an alignment machine learning model based on the information identifying parts of the source object, the information identifying parts of the target object, the shape vector for the source object, and the shape vector for the target object.

2. The method of claim 1, wherein the feature extraction machine learning model further comprises:
    a first branch that generates information identifying parts of the object; and
    a second branch that generates a shape vector describing a shape of the object.

3. The method of claim 1, wherein the two or more mixed diffusion and convolution layers are exactly four mixed diffusion and convolution layers.

4. The method of claim 1, wherein the shape vector for the source object includes one or more of: a size of at least a portion of the source object, a volume of at least a portion of the source object, a curvature of at least a portion of the source object, and a length of at least a portion of the source object.

5. The method of claim 1, wherein the category of the source object is one of: a human, a particular non-human species of animal, a biped, a quadruped, a set prop, furniture, or a tool.

6. The method of claim 1, further comprising:
    converting the source object representation from a first form to a third form; and
    converting the target object representation from a second form to the third form.

7. The method of claim 6, wherein the first form comprises a point cloud, a mesh, or a volume.

8. The method of claim 1, further comprising:
    identifying one or more user-defined weights, wherein generating the aligned target object representation is further based on the weights.

9. The method of claim 1, further comprising:
    identifying information defined at locations of the source object representation;
    modifying the aligned target object representation based on the information defined at the locations of the source object representation; and
    using the modified aligned target object representation to generate an animation frame.

10. A system for aligning objects for computer generated imagery, the system comprising one or more processors configured to:
    obtain a source object representation representing a source object and a target object representation representing a target object;
    identify a category of the source object and a category of the target object, wherein identifying the category of the source object and identifying the category of the target object comprises providing the object representations to a classifier machine learning model, wherein the classifier machine learning model is a neural network comprising:
        an input layer for accepting an object representation corresponding to an object;
        two or more mixed diffusion and convolution layers; and
        an output layer for outputting a probability that the object is part of a particular category of objects;
    based on the category of the source object and the category of the target object, select a feature extraction machine learning model from a set of feature extraction machine learning models for different object categories;
    provide the source object representation and the target object representation as input to the selected feature extraction machine learning model;
    generate, by the feature extraction machine learning model, information identifying parts of the source object, information identifying parts of the target object, a shape vector for the source object, and a shape vector for the target object; and
    generate an aligned target object representation that is aligned with the source object representation and usable for animating the target object, the generating using an alignment machine learning model based on the information identifying parts of the source object, the information identifying parts of the target object, the shape vector for the source object, and the shape vector for the target object.

11. The system of claim 10, wherein the feature extraction machine learning model further comprises:
    a first branch that generates information identifying parts of the object; and
    a second branch that generates a shape vector describing a shape of the object.

12. The system of claim 10, wherein the two or more mixed diffusion and convolution layers are exactly four mixed diffusion and convolution layers.

13. The system of claim 10, wherein the shape vector for the source object includes one or more of: a size of at least a portion of the source object, a volume of at least a portion of the source object, a curvature of at least a portion of the source object, and a length of at least a portion of the source object.

14. The system of claim 10, wherein the category of the source object is one of: a human, a particular non-human species of animal, a biped, a quadruped, a set prop, furniture, or a tool.

15. The system of claim 10, the one or more processors further configured to:
 converting the source object representation from a first form to a third form; and
 converting the target object representation from a second form to the third form.

16. The system of claim 15, wherein the first form comprises a point cloud, a mesh, or a volume.

17. The system of claim 10, the one or more processors further configured to:
 identify one or more user-defined weights, wherein
 generating the aligned target object representation is further based on the weights.

18. The system of claim 10, the one or more processors further configured to:
 identify information defined at locations of the source object representation;
 modify the aligned target object representation based on the information defined at the locations of the source object representation; and
 use the modified aligned target object representation to generate an animation frame.

* * * * *